(12) United States Patent
Desaulniers (10) Patent No.: US 8,832,981 B2
(45) Date of Patent: Sep. 16, 2014

(54) RESCUE LOCATOR SIGNAL

(75) Inventor: Richard C. Desaulniers, Charleston, SC (US)

(73) Assignee: Rescued In Time, LLC, Mt. Pleasant, SC (US)

( * ) Notice: Subject to any disclaimer, the term of this patent is extended or adjusted under 35 U.S.C. 154(b) by 0 days.

(21) Appl. No.: 13/088,467

(22) Filed: Apr. 18, 2011

(65) Prior Publication Data

US 2012/0260545 A1 Oct. 18, 2012

(51) Int. Cl.
*G06F 15/00* (2006.01)

(52) U.S. Cl.
USPC ............... 40/610; 116/209; 116/210; 404/10

(58) Field of Classification Search
USPC ......... 116/63 P, 209, 63 R; 40/217, 218, 406, 40/409, 604
See application file for complete search history.

(56) References Cited

U.S. PATENT DOCUMENTS

| | | | | |
|---|---|---|---|---|
| 1,128,136 A * | 2/1915 | Hano | ............................. | 150/147 |
| 3,229,290 A * | 1/1966 | Fisher | ............................. | 342/12 |
| 3,952,694 A * | 4/1976 | McDonald | .................... | 116/209 |
| 4,114,561 A | 9/1978 | Assaro | | |
| 4,182,063 A * | 1/1980 | Klosel | ............................ | 40/610 |
| 4,295,438 A | 10/1981 | Porter | | |
| 4,768,739 A * | 9/1988 | Schnee | ........................ | 244/146 |
| 5,122,797 A * | 6/1992 | Wanasz | ...................... | 340/908.1 |
| 5,349,920 A * | 9/1994 | Koizumi | ..................... | 116/28 R |
| 5,421,287 A | 6/1995 | Yonover | | |
| 6,415,734 B1 * | 7/2002 | LaPuzza | ....................... | 116/201 |
| 6,662,744 B2 * | 12/2003 | Wallhouse | ................... | 116/209 |
| 6,955,496 B2 * | 10/2005 | Burchell | ........................ | 404/10 |
| 7,117,619 B1 * | 10/2006 | Huber | ............................ | 40/495 |
| D536,037 S * | 1/2007 | Kudimi | ......................... | D19/63 |
| 7,302,908 B1 * | 12/2007 | Bieberdorf | .................. | 116/63 P |
| 7,571,561 B1 * | 8/2009 | Garcia | ......................... | 40/606.15 |
| 7,574,973 B2 * | 8/2009 | Markham | ..................... | 116/209 |
| 7,624,696 B2 * | 12/2009 | Desourdis et al. | .......... | 116/63 R |
| 7,695,334 B2 * | 4/2010 | Yonover et al. | ................. | 441/36 |
| 8,002,493 B2 * | 8/2011 | Audet | ............................ | 404/10 |
| 2002/0104472 A1 * | 8/2002 | Neubert | ........................ | 116/209 |
| 2003/0094127 A1 * | 5/2003 | Stelmach | ...................... | 116/211 |
| 2006/0231012 A1 * | 10/2006 | Wamester et al. | ............ | 116/210 |

* cited by examiner

*Primary Examiner* — Shin Kim
(74) *Attorney, Agent, or Firm* — J. Bennett Mullinax, LLC (57) ABSTRACT

A rescue locator signal is provided that includes a central member with a first arm extending therefrom in a first direction. A second arm extends from the central member in a second direction that is completely opposite to the first direction, and a third arm extends from the central member in a third direction. A fourth arm extends from the central member in a fourth direction that is completely opposite to the third direction. A plurality of reflective members are located on upper surfaces of the first arm, second arm, third arm, and fourth arm.

18 Claims, 8 Drawing Sheets

RESCUE LOCATOR SIGNAL

FIELD OF THE INVENTION

The present invention relates generally to a rescue locator signal that may be used to produce a rescue signal for an individual or individuals who are lost or who have had an accident. More particularly, the present application involves a rescue locator signal that can be housed inside of a pouch when not in use and that can be located on the ground during use in order to provide information to air and land search parties.

BACKGROUND

Location signals are known for use in allowing search parties to locate and recover individuals or groups that are lost or injured. Various types of signals may be employed. For example, personal locator beacons may be carried by individuals or may be located within an airplane, helicopter, ATV, or other vehicle. The beacon can be actuated either manually by the individual or automatically upon being exposed to a predetermined amount of force. The personal locator beacon sends a signal to a satellite which is then transmitted to a rescue station to identify the individual or group in distress along with their precise coordinates. Beacons, and beacon systems, are capable of providing a rescue signal for those in need but are subject to multiple false alarms, loss of battery power, and inoperability when located between canyon walls or otherwise inaccessible to satellite. Additionally, some of these systems or devices are high in initial cost and/or have high monthly service fees.

Additional mechanisms of signaling for aid are also known. For example, an inflatable balloon may be deployed that can rise above the treetop canopy to alert rescue personnel. Although capable of sending a distress signal, the balloon may be pushed down or to the side by wind thus making it hard to visualize, or may become deflated should helium or other gas within the balloon leak or should the balloon become punched. Helium bottles are heavy and have to be re-filled periodically. Cell phones, flare guns, signaling mirrors, whistles, signal lights, and emergency strobe lights may likewise be used by lost, injured, or stranded individuals to signal rescue workers.

Although all of these mechanisms of signaling are known, they are limited in the information they can convey in view of the robustness of the particular system. Certain signaling mechanisms may not be continuous in nature and capable of functioning when the individuals in need of aid are hidden from view. People that are lost or injured in the wilderness often become dehydrated and exhausted. They must seek shelter in a shaded area or snow cave, and may not be able to proactively attract attention to their location on a continuous basis. As such, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a rescue location signal 10 that can be used to locate lost and/or injured individuals. The rescue location signal 10 may be placed by the lost/injured individual onto the ground 100 and retained thereon. The rescue location signal 10 may include certain elements that function to attract attention of a rescue aircraft or search party from certain angles. For example, the rescue location signal 10 may be in the shape of an X, may be brightly colored, and may include a plurality of reflective members 56 that reflect light in a plurality of angles and directions. Once the search party locates and approaches the rescue location signal 10, a form 64 may be provided that communicates to the search party the names of the individuals in need of assistance, their condition, and their location relative to the all ready located rescue location signal 10. With this functionality, the individuals in need of assistance need not be located right at the rescue location signal 10, but can be some distance away in a shelter, cave, or other location that provides more safety and comfort than an open or other location proximate to the rescue location signal 10. The rescue location signal 10 may provide a steady, reliable, effective and robust distress communication to search parties.

Figure 1:
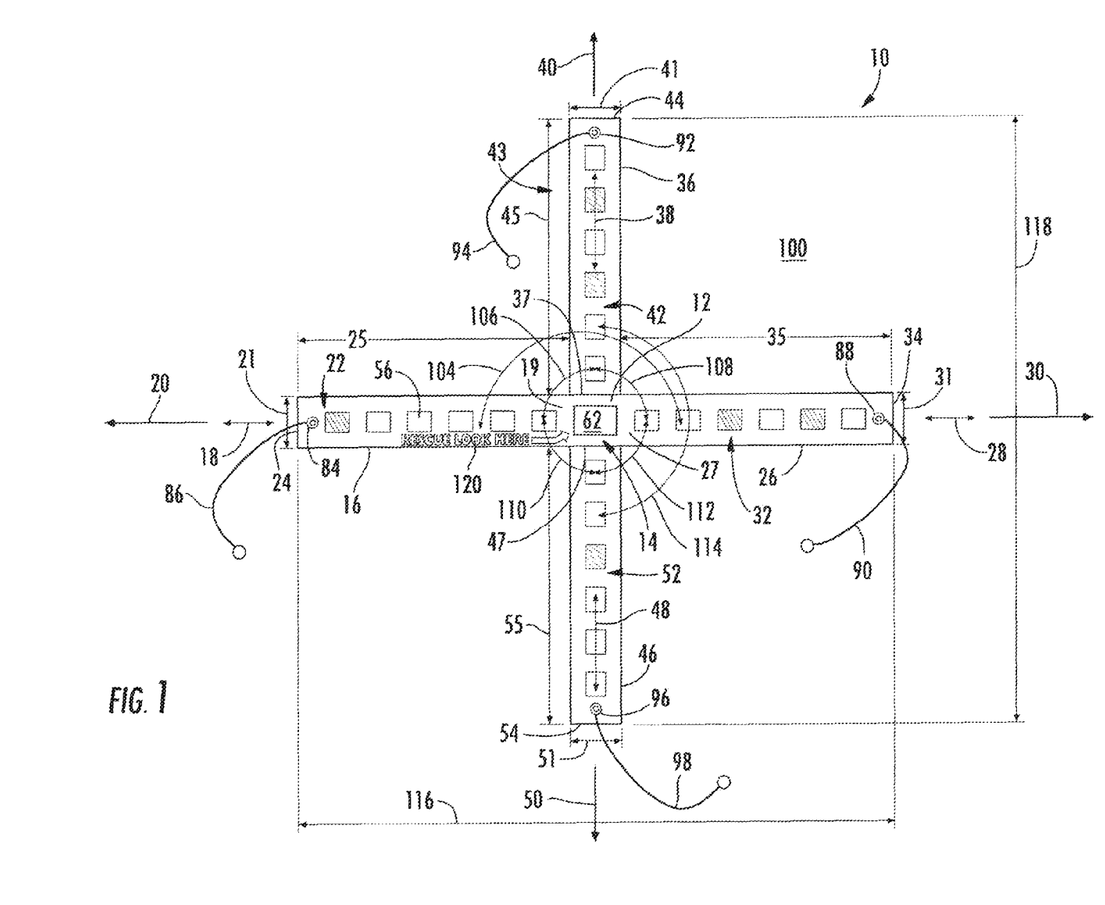
FIG. 1 is a top plan view of a rescue location signal in accordance with one exemplary embodiment.

One exemplary embodiment of a rescue location signal 10 is illustrated with reference to FIG. 1. The rescue location signal 10 may be in the shape of a cross, which is the international symbol for distress. A central member 12 is located at the center of the rescue location signal 10 and can have an upper surface 14 that is rectangular in shape. In some instances, the upper surface 14 may be square shaped and may be of a color that functions to attract the eye of a search party. If square shaped, the four sides of the upper surface 14 may be 14 inches in length. The upper surface 14 may be orange in certain arrangements, although other colors are possible. A series of arms 16, 26, 36, and 46 radiate outwards from the central member 12.

A first arm 16 extends from the central member 12 in a first direction 20. The first arm 16 and the central member 12 may be a single integral piece, or may be separate pieces. For example, an end 19 of the first arm 16 that engages the central member 12 may be integrally formed with the central member 12, or the end 19 can be connected to the central member 12 through adhesion, sonic welding, or mechanical fasteners. The first arm 16 may extend in the first direction 20 that is in a longitudinal direction 18 of the first arm 16 so as to have a longitudinal length 25. The longitudinal length 25 extends from the end 19 to a terminal end 24 of the first arm 16. The longitudinal length 25 may be 5.86 feet in certain exemplary embodiments. In other arrangements, the longitudinal length 25 may be from 5-6 feet, from 3-8 feet, from 7-10 feet, or up to 20 feet.

The first arm 16 may have a width 21 that extends in a direction perpendicular to the longitudinal direction 18 when an upper surface 22 of the first arm 16 is rectangular in shape. The width 21 may be 14 inches in one embodiment, although the width 21 can be sized differently in other arrangements. The upper surface 22 can be made of a color, such as orange, that attracts the attention of a search party. The color of the upper surface 22 may be the same as that of the upper surface 14, or the color of the upper surfaces 14 and 22 may be different. The first arm 16 may be rigid or flexible. The first arm 16 can be made out of polyvinyl chloride in certain arrangements. In some versions of the rescue locator symbol 10, the first arm 16 may be made out of flexible polyvinyl chloride that can be obtained from TMI, LLC having offices located at 5350 Campbells Run Road, Pittsburgh, Pa. 15205, USA. However, the first arm 16 may be made out of any type of material in other exemplary embodiments. When flexible, the first arm 16 may be flexible to such an extent that light wind may cause portion of the first arm 16 to flex so that a plurality of wrinkles are present in the upper surface 22 so that portions of the upper surface 22 face in a multitude of directions and not all in the same direction.

A series of reflective members 56 may be located on the upper surface 22. Although six reflective members 56 are disclosed on the upper surface 22, any number may be present in other exemplary embodiments. For instance, from 1-10, from 10-50, or up to 100 reflective members may be present on the upper surface 22 in accordance with different exemplary embodiments. The reflective members 56 function to reflect light, either natural light or artificially generated light, for visualization by a search party to aid the search party in seeing the rescue locator signal 10. The reflective members 56 may be made of any material or materials capable of reflecting light. For example, the reflective members 56 may be made out of biaxially-oriented polyethylene terephthalate. In some arrangements, the reflective members 56 are made of reflective MYLAR® that may be provided by Greentrees Hydroponics, having offices located at 2581 Pioneer Avenue, Suite D, Vista, Calif. 92081, USA. The reflective members 56 can be attached to the upper surface 22 in a variety of manners. For example, the reflective members 56 may be attached to the upper surface 22 through adhesion, mechanical fasteners, sonic welding, sewing, hook and loop type fasteners (one example of which has the trade name VELCRO®) or may be integrally formed with the upper surface 22. As used herein, the term "on the upper surface" is broad enough to include arrangements where the reflective members 56 are located on the upper surface 22 and extend upwards beyond the upper surface 22, are located flush with the upper surface 22 and do not extend upwards beyond the height of the upper surface 22, and are depressed within the upper surface 22 so that the height of the upper surface 22 is greater than the height of the reflective members 56. Therefore, when noted as being on the upper surface, it is to be understood that the reflective members 56 are only carried by the arm and may, but need not be, located on the upper surface of the arm such that they extend above the upper surface.

When made of a flexible material, the reflective members 56 may have wrinkles thereon when used. These wrinkles may cause each one of the reflective members 56 to reflect light in a variety of directions. Further, since the first arm 16 is flexible, this feature may cause the reflective members 56 to be oriented in a variety of directions. Therefore, the reflective members 56 need not be flexible in certain embodiments. When both the reflective members 56 and the first arm 16 are flexible, their combination may likewise cause the reflective members 56 to be oriented in a variety of directions.

Figure 2:
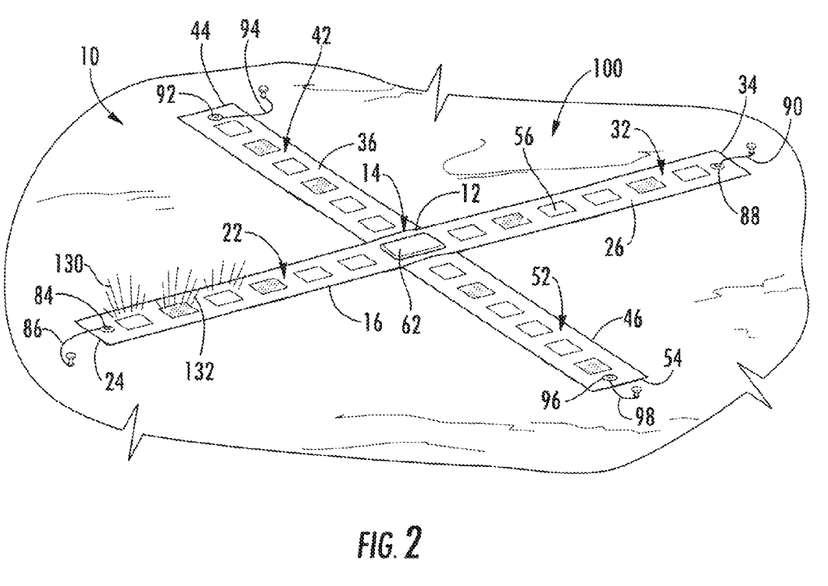
FIG. 2 is a perspective view of the rescue location signal of FIG. 1 shown located on the ground.

With reference now to FIG. 2, the rescue locator signal 10 of FIG. 1 is shown located on the ground 100. The flexible nature of the first arm 16 causes the first arm 16 to conform to the contours of the ground 100. The first arm 16 may be light enough such that it is held by grass, brush, or other objects so that it does not lay flat against the ground 100 but instead have a variety of contours. In other embodiments, the first arm 16 may lay flat against the ground 100 and have no wrinkles or other contours. The reflective members 56 are likewise flexible in nature and can have a variety of contours. Wind or other forces may further act on the first arm 16 to change the position of the first arm 16. The first arm 16 may be light enough such that it will move even when subjected to a light wind.

Optical signaling is known for use in attracting a search party. Here, the lost or injured individual will use a mirrored surface to direct sunlight at an airplane, ship, or ground search party. The individual must be careful to use proper techniques to carefully aim the reflected light to the target or otherwise it will not be viewed. The individual must therefore be present with the mirrored surface in order for it to be effective, otherwise he or she cannot properly target the rescue party. The reflective members 56 allow the individual, if he or she chooses, not to be present in order to provide this signal. The series of reflective members 56 along the upper surface 22, in addition to those on the other upper surfaces 32, 42 and 52 reflect light along a line and in a cross direction so that the light is more likely to be seen.

The reflective members 56 may also direct light in a variety of different directions to further increase the odds that a search party will see the rescue locator signal 10. With reference to FIG. 2, the last two reflective members 56 on the first arm 16 are shown as emitting reflected light 130 and reflected light 132. The reflective member 56 closest to the terminal end 24 emits reflected light 130 in a direction different from the direction of reflected light 132 that is emitted from the next consecutive reflective member 56. These two reflective members 56 may be oriented in different directions due to their location on the first arm 16, and due to the fact that the first arm 16 and/or the reflective members 56 themselves may be flexible and thus naturally lay in different positions. In some instances the reflected light 130 may be directed directly upwards but at an angle to and thus away from the central member 12, while the reflected light 132 is directed upwards but parallel to a surface normal of the upper surface 14. The flexibility of the first arm 16 and the reflective members 56 also may cause the reflected light 130 and 132 to be angled with respect to the upper surface 22 so that they are directed in a direction generally parallel with the longitudinal directions 38 and 50 but at an angle to the upper surface 22 so as not to be parallel to a surface normal of upper surface 22. As such, the reflected light 130 and 132 can be emitted in any direction. In some embodiments, one or more of the reflective members 56 are arranged in similar directions and emit light in a similar direction. In other arrangements, the reflective members 56 are randomly oriented so that emitted light from each reflective member 56 is directed at a different angle from a common point, such as the upper surface 14.

A breeze may function to help move the various arms 16, 26, 36, and 46 and reflective members 56 so that emitted light is directed in a multitude of angles thus increasing the chances that some of the emitted light will be reflected onto a search party and noticed. However, it is to be understood that in other exemplary embodiments that the positions and orientations of the reflective members 56 are fixed so that they only emit light in a single direction.

The upper surface 22 may be made of a color, such as orange, that functions to further increase visibility. The reflective members 56 may be arranged in a line along the longitudinal direction 18 of the first arm 16 so that they are in the center of the upper surface 22 evenly spaced from the upper and lower edges. The reflective members 56 may be evenly spaced from one another along the upper surface 22 so that colored portions of the upper surface 22 are between consecutive reflective members 56. The reflective members 56 may be disposed on the upper surface so that they, along with the empty spaces between consecutive reflective members 56, extend across more than half of the longitudinal length 25 and across substantially all of the longitudinal length 25. In other arrangements a single reflective member 56 that is elongated is present and may extend across more than half of the longitudinal length 25. The single reflective member 56 may be flexible so that it can emit light in a variety of directions even though it is but a single member since it can be wrinkled or otherwise folded and oriented in multiple directions.

Referring back to FIG. 1, the rescue locator symbol 10 also includes a second arm 26 that extends from the central member 12 in a second direction 30 that is parallel to the longitudinal direction 28 of the second arm 26. The second arm 26 is arranged so that its upper surface has a longitudinal length 35 that extends from an end 27 that engages the central member 12 to a terminal end 34 at its outer extreme. The width 31 of the upper surface 32 extends from a top edge to a bottom edge. The second arm 26 and all of the aforementioned components of the second arm 26, along with the reflective members 56 of the second arm 26 may be sized, arranged, and configured in the manners previously discussed with respect to the first arm 16 and its associated parts, and a repeat of this information is not necessary.

The first arm 16 and second arm 26 can be arranged with respect to one another so that the first direction 20 is parallel to the second direction 30 but the directions 20 and 30 are completely opposite to one another. An angle 104 between longitudinal direction 18 and longitudinal direction 28 may be 180°. However, in other embodiments the angle 104 may be from 110° to 260°. The first arm 16, central member 12, and second arm 26 may all be a single, integral piece, or two or more of these components may be different members that are attached either permanently or removably to one another.

The rescue locator signal 10 also has a third arm 36 that extends from the central member 12 along a longitudinal direction 38 in a third direction 40. The longitudinal length 45 of the third arm 36 extends from an end 37 that engages the central member 12 to a terminal end 44. The width 41 of the third arm 36 extends from the left side to the right side of the upper surface 42. Reflective members 56 may also be located on the upper surface 42. The third arm 36 and its associated components along with the reflective members 56 may be arranged in the manners previously discussed with reference to the first arm 16, its components, and its reflective members 56, and a repeat of this information is not necessary.

The longitudinal direction 38 of the third arm 36 may be oriented at an angle 106 to the longitudinal direction 18 that is 90°. In other embodiments, the angle 106 may be from 30° to 160°. The third arm 36 can be oriented with respect to the second arm so that the longitudinal direction 38 is at an angle 108 to the longitudinal direction 28 that is 90°. In other variations, angle 108 can be from 30° to 160°. The various longitudinal directions as disclosed herein can extend along the center of the arms away from the central member 12, or may extend along the edges of the arms that run in the long direction/longitudinal direction away from the central member 12. As such, when an angle between two of the arms is referenced, this may also be taken to mean the angle between the longitudinal directions of these two arms.

A fourth arm 46 may also be present in the rescue locator signal 10. The fourth arm 46 may extend in a longitudinal direction 48 away from the central member 12 in a fourth direction 50. The fourth arm 46 can have a longitudinal length 55 that is from the end 47 proximate to the central member 12 to a terminal end 54. An upper surface 52 of the fourth arm 46 may have a width 51 that extends from the left edge to the right edge as illustrated in FIG. 1. The fourth arm 46, and its associated components along with the reflective members 56 located on the upper surface 52 may be arranged in manners similar to those previously discussed with respect to the first arm 16, its associated components, and the reflective members 56 of the first arm 16, and a repeat of this information is not necessary.

An angle 110 of 90° is present between the longitudinal directions 18 and 48. An angle 112 also of 90° is present between the longitudinal directions 28 and 48. These angles 110 and 112 may be different in other exemplary embodiments and may be from 20° to 160° in various arrangements of the rescue locator system 10. The longitudinal direction 48 is parallel to the longitudinal direction 38, but the fourth direction 50 is completely opposite to the third direction 40. The fourth arm 46 is oriented at an angle 114 to the third arm 36 that is 180°. Again, the various angles may be either angles between the arms at their longitudinal directions down the center of the arms, or between the edges of the arms that extend along their longitudinal lengths.

The arms 16, 26, 36 and 46 form a cross such that the longitudinal lengths 25, 35, 45 and 55 are all equal. Likewise, the widths 21, 31, 41, and 51 may all be equal so that the shape and size of the upper surfaces 22, 32, 42 and 52 are likewise all equal. However, it is to be understood that the longitudinal lengths 25, 35, 45 and 55, in addition to or alternatively to the widths 21, 31, 41 and 51 need not all be equal in other arrangements. Further, although shown as being equally sized and rectangular in shape, the upper surfaces 22, 32, 42 and 52 may be sized different from one another and need not have rectangular shapes in other arrangements. The length 116 of the rescue locator signal 10 that is measured from the terminal end 24 to the terminal end 34 may be 12.9 feet. The width 118 of the rescue locator signal 10 that may be measured from the terminal end 44 to terminal end 54 may be 12.9 feet. The length 116 can equal the width 118, or these two distances may be different in other arrangements.

The rescue locator signal 10 can be secured to the ground 100, or may simply be placed onto the ground 100 unsecured. A first grommet 84 may be present on the first arm 16. The first grommet 84 may be an aperture disposed through the first arm 16 that is reinforced with stronger or extra material to compensate for the presence of the aperture. The first grommet 84 can be located between the reflective members 56 and the terminal end 24 in the longitudinal direction 18. A first tie down 86, that can be a rope or string, can be disposed through the first grommet 84 and attached to a tree or to the ground 100. The tether may be 30 feet in length in accordance with certain exemplary embodiments and may be light weight. As illustrated, the first tie down 86 has a stake that is driven into the ground 100. The first tie down 86 may be used to fix a location of the end of the first arm 16 while the rest of the first arm 16 can be moved or disturbed via wind forces.

The other arms 26, 36 and 46 also can include grommets and tie downs. A second grommet 88 and second tie down 90 are associated with the second arm 26, and a third grommet 92 and third tie down 94 are located at the third arm 36. A fourth grommet 96 is located at the fourth arm 46, and a fourth tie down 98 functions to hold the fourth arm 46. The grommets 88, 92, and 96 and tie downs 90, 94, and 98 can be arranged in the same manners as previously discussed with respect to the first grommet 84 and the first tie down 86, and a repeat of this information is not necessary. Additional grommets and tie downs may be used on the rescue locator signal 10 in order to provide additional retention to the ground 100. When four of the grommets and tie downs are used to attach the arms 16, 26, 36, and 46 proximate to their terminal ends, wind may cause the central member 12 along with the vast majority of the lengths of the arms to sway or move thus securing the rescue locator signal 10 while at the same time allowing the reflective members 56 to reflect light in various directions.

Once the search party observes the rescue locator signal 10, the team may approach the rescue locator signal 10 on the ground 100. Indicia 120 is presented on the upper surface 22 of the first arm 16 and instructs the search party to look at a form 64 located on the upper surface 14 of the central member 12. The indicia 120 reads "RESCUE LOOK HERE" and has an arrow pointing to the form 64 to alert the rescue party of its presence. A member of the rescue team may then open up a message pouch 62 that is located on the upper surface 22 to retrieve the form 64. Alternatively, the message pouch 62 may be a transparent cover that rests over the form 64 so that the form 64 does not have to be removed but can simply be read through the transparent cover. The message pouch 62 may be variously configured and can be opened in a number of different manners. The message pouch 62 need not have a transparent cover, and may be opened and closed through a button, hook and loop type fastener, or zip-lock attachment. The message pouch 62 may be waterproof. The form 64 may have information on two sides so the message pouch 62 may need to be opened so that the reader may access all of the intended information, unless the message pouch 62 is somehow partially detached or pivoted to the central member 12 to allow the form 64 to be viewed on both sides. One or both of the sides of the form 64 may instruct the user that information is on the other side, or such a message may be placed on another portion of the rescue locator symbol 10.

Figure 6:
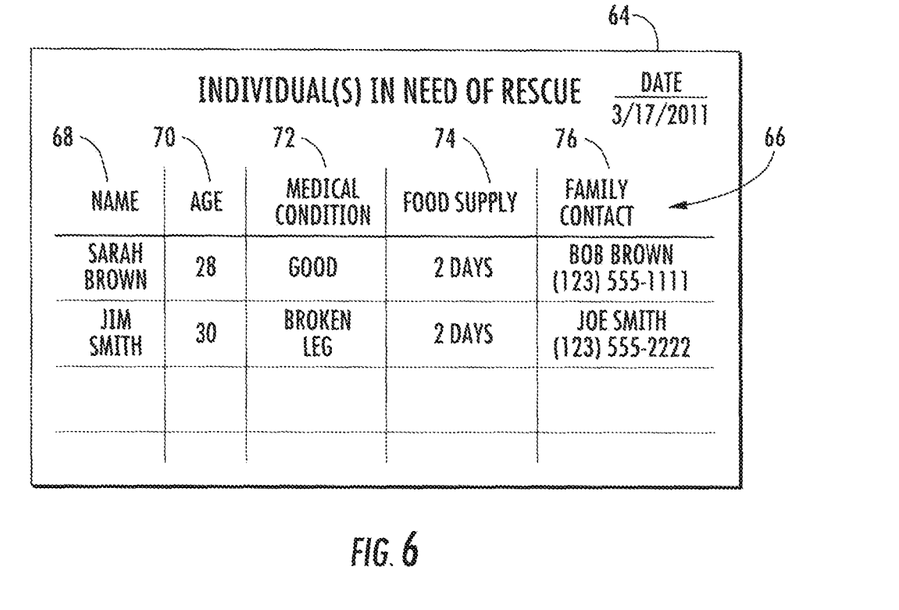
FIG. 6 is a view of a front surface of a form that can be located in a message pouch that is water resistant in accordance with one exemplary embodiment.
Figure 7:
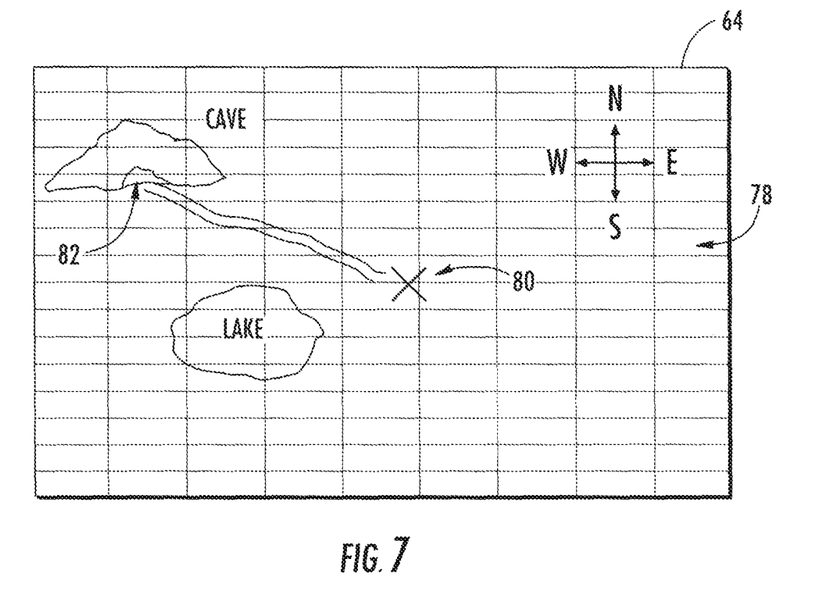
FIG. 7 is a view of a back surface of the form of FIG. 6.

In use of the rescue locator symbol 10, the individual that is lost or injured may access the form 64 by removing it from the message pouch 62. A pen or pencil, not shown, may be provided in the message pouch 62 to allow the user to enter certain information on the form 64. Referring now to FIGS. 6 and 7, a sample form 64 is illustrated. The front surface 66 of the form 64 is shown in FIG. 6. Requested information in the form of the names 68 of individuals is printed on the front surface 66. Additional information that may be requested includes the ages 70 of the individuals, their medical condition 72, their food supply 74, and family contact information 76. The user may fill out all of this information for the people that are lost or injured and in need of rescue. Information for two such individuals is illustrated. The form 64 may be waterproof, and a writing instrument can be provided either in the storage tube 58 or otherwise attached to the rescue locator signal 10 for use by the individual in need of rescue.

The back surface 78 of the form 64 is shown with reference to FIG. 7. A grid is located on the back surface 78 and a scale may be provided either preprinted, or subsequently by the user. The location 80 of the rescue locator signal 10 may be preprinted in the center of the grid. Location 80 serves as a reference point for the search team. The actual location 82 of the individuals in need of rescue is written onto the grid on the back surface 78 by the person that is lost or injured. As shown, the lost or injured people have taken refuge in a cave and thus do not have to sit by the rescue locator symbol 10, which may be positioned in an open area devoid of shelter. Alternatively, the people in need of rescue may be located next to the rescue locator signal 10. The form 64 provides information as to the location and status of the individuals in need of assistance so that they may be physically remote from the rescue locator signal 10. In some instances, instead of an actual location, the lost or injured individuals may attempt to travel out of the wilderness. The location 82 may be a desired destination or a direction of travel of the individuals in need of rescue.

The form 64 may or may not be present in certain arrangements. However, when present, the form 64 provides additional utility to the rescue locator signal 10 so that the search party can obtain more accurate information regarding the circumstances of the individuals in need of rescue and their location. Visualization of the rescue locator symbol 10 informs the search party that an individual is in fact in need of rescue and directs them to the general location. The form 64 provides additional information that is more specific in character than can be obtained through just visualization of the arms 16, 26, 36 and 46 and reflective members 56.

Figure 4:
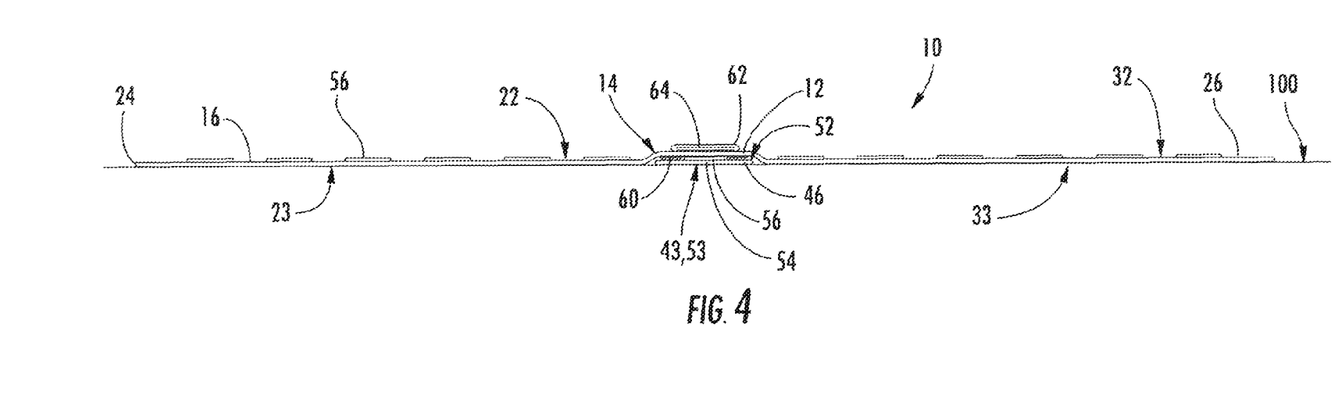
FIG. 4 is a front elevation view of a rescue location signal in accordance with another one exemplary embodiment.

With reference now to FIG. 4, a side view of one embodiment of the rescue locator signal 10 is shown. A lower surface 23 of the first arm 16 contacts the ground 100, and a lower surface 33 of the second arm 26 contacts the ground 100. A lower surface 53 of the fourth arm 46 engages the ground 100, and a lower surface 43 (not shown in FIG. 4) engages the ground 100 as well. The first arm 16, central member 12, and second arm 26 are a single, integral piece. The third arm 36 and fourth arm 46 are likewise a single, integral piece as a section of material may be between the ends 37 and 47 that is integrally formed with both arms 36 and 46. A hook and loop type fastener 60 can be arranged at the bottom surface of the central member 12 and at the top surface of this section of material so that the user can attach the integral piece of the first arm 16, central member 12, and second arm 26 to the integral piece of the third arm 36, the fourth arm 46, and this section of material. The hook and loop type fastener 60 can be detached so that these components are likewise removed from one another. In other arrangements, the arms 16, 26, 36 and 46 can be permanently attached or integrally attached to the central member 12 so that this detachment is not present.

Figure 5:
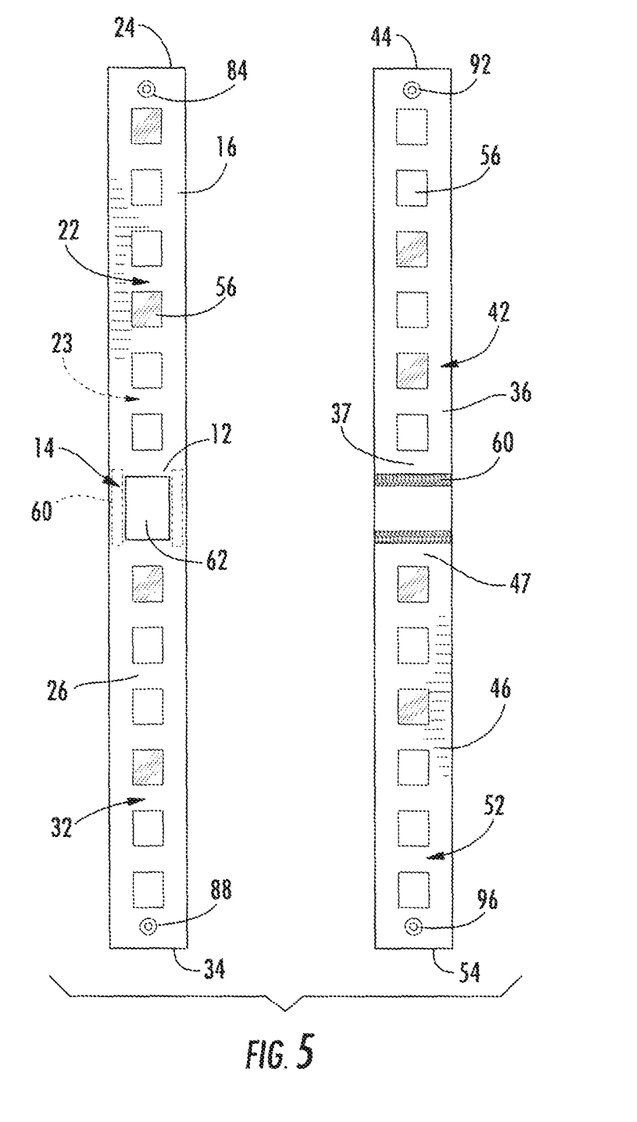
FIG. 5 is a top plan view of detached portions of a rescue location signal in accordance with another exemplary embodiment.

FIG. 5 shows the rescue locator signal 10 in a detached state such that the portion making up arms 16 and 26 and central member 12 are detached from the portion making up the third arm 36 and the fourth arm 46. A message pouch 62 is located at the central member 12 and may be rectangular in shape so as to be 13 inches by 9.5 inches in size. A hook and loop type fastener 60 may be employed to allow the two portions to be attached to one another and to be removed from one another. Two strips of loop portions of the hook and loop type fastener 60 can be located on the lower surface of the central member 12 and may extend in the longitudinal direction. Two complimentary strips of hooks of the hook and loop type fastener 60 may be located on the upper surface of the section that connects the third and fourth arms 36 and 46. The strips of hooks may be transverse so as to extend at an angle of 90° to the longitudinal direction. The hooks and loops can be attached to and removed from one another to effect attachment and removal of the rescue locator signal 10.

Figure 3:
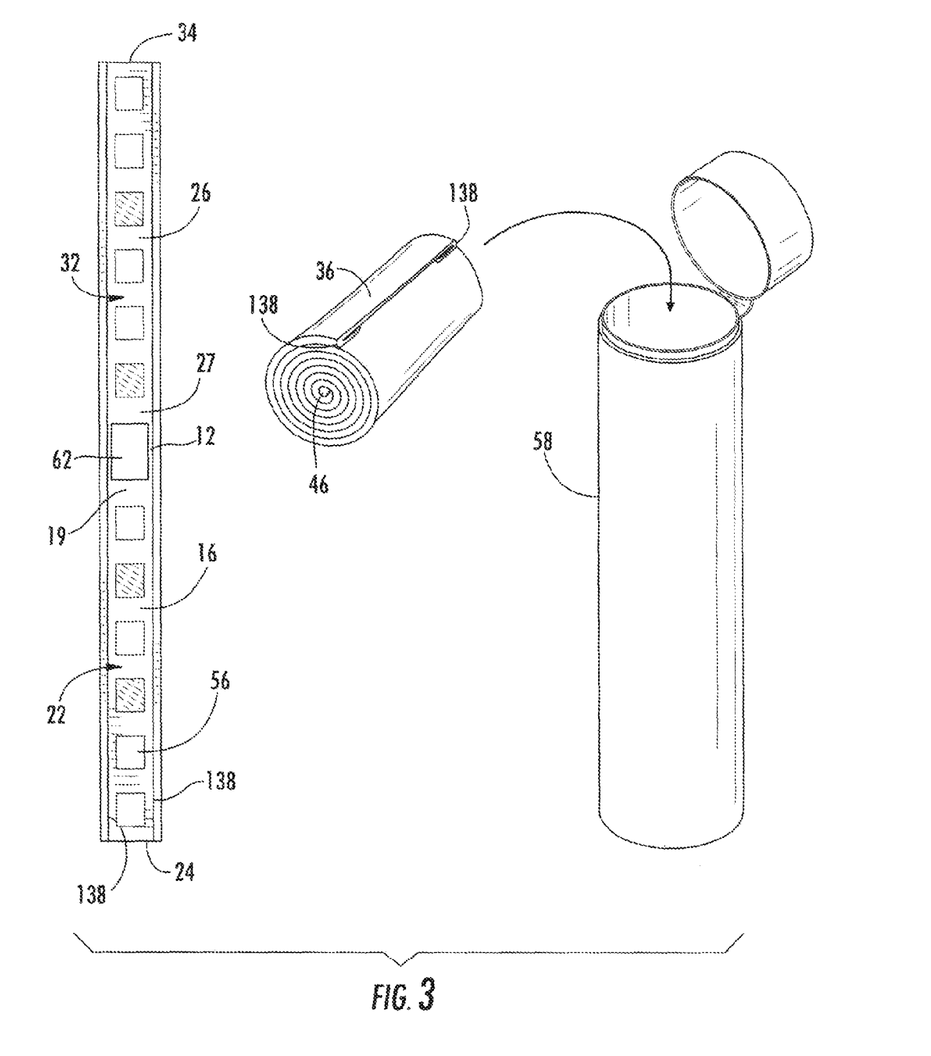
FIG. 3 is a perspective view of the rescue location signal of FIG. 1 folded and rolled up for insertion into a pouch.

For storage purposes, the two pieces of the rescue locator signal 10 may be detached from one another and folded and then placed into a storage tube 58 as shown with reference to FIG. 3. Various components of the rescue locator signal 10 such as the arms 16, 26, 36, and 46, the reflective members 56, and the central member 12 may be flexible so that the rescue locator signal 10 can be folded up and rolled up in this manner. In this regard, each piece can be laid onto the ground and then their sides can be folded in some amount, for example 2 inches. These fold lines are labeled 138 in FIG. 3. In instances when the width of each piece is 14 inches, creation of the folds 138 decrease the resulting width to 10 inches. Each piece may then be rolled up as shown for example with reference to arms 36 and 46 in FIG. 3. The piece having arms 16 and 26 may be folded and rolled up in a similar manner and may be either rolled on top of the rolled arms 36 and 46 to create one large rolled piece. Alternatively, both pieces can be rolled up and then stacked on top of one another. The rolled pieces can be placed into the storage tube 58 for storage. The storage tube 58 including the rescue locator signal 10 can be light weight so that a person or group can easily and conveniently transport same. The storage tube 58 may be waterproof and may be 10 inches in length and 3.5 inches in diameter.

The storage tube 58 holding the rescue locator signal 10 can be carried by an individual when hiking, stored in a vehicle, or otherwise placed with camping gear or other items so that it may be conveniently carried and stored. Again, although shown as being two pieces, the rescue locator signal 10 can be a single piece that is folded up and placed into storage tube 58. Other embodiments are possible in which the rescue locator signal 10 is not folded and is not placed into a storage tube 58.

Figure 8:
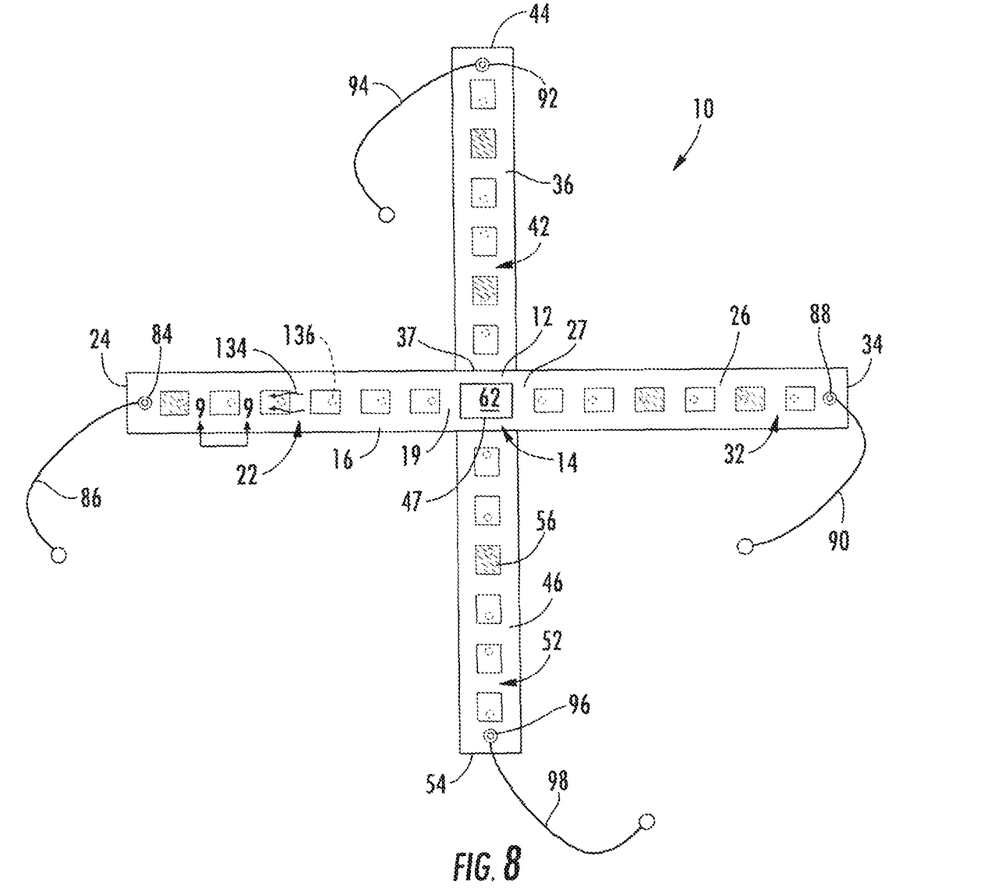
FIG. 8 is a top, plan view of a rescue location signal that includes vortex generators in accordance with another exemplary embodiment.
Figure 9:
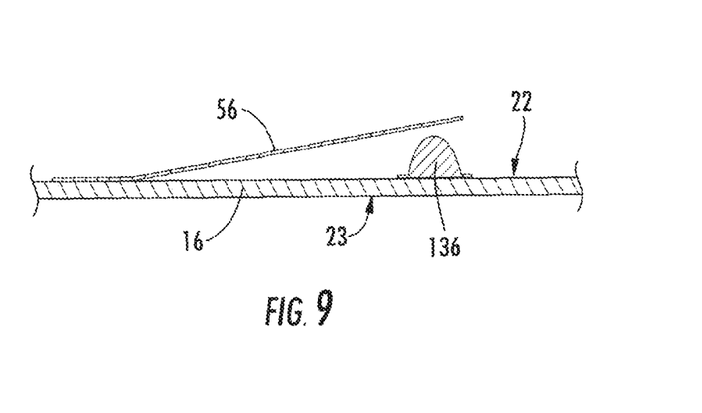
FIG. 9 is a cross-sectional view taken along line 9-9 of FIG. 8.

FIGS. 8 and 9 illustrate an embodiment in which a plurality of vortex generators 136 are present in order to aid the reflective members 56 in moving in order to generate reflected light from multiple angles and directions. The reflective members 56 may be of any size, and in one embodiment may be 4.5 inches by 6 inches in size. The vortex generators 136 are located on the upper surfaces 22, 32, 42, and 52 of the arms 16, 26, 36 and 46 and are projections that function to lift an end of the reflective members 56 off of the upper surfaces 22, 32, 42 and 52. The vortex generators 136 may help air flow around, across, and/or under the reflective members 56 so that the reflective members 56 are more likely to move in response to wind forces, or are more likely to move more in response to wind forces. The reflective member 56 when laying down may contact the vortex generator 136 so that the reflective member 56 will never lay flat against the top of the arm to which it is attached. The reflective member 56 may engage the arm on one end, may engage the vortex generator 136 on an opposite end, and be spaced from the arm in between so that it does not contact the arm in this area when wind forces are not acting on the reflective member 56.

For purposes of discussion, the vortex generator 136 and reflective member 56 at the end of arm 16 are being discussed, however it is to be understood that the other elements may be configured in an identical manner. An end of the reflective member 56 is attached to the upper surface 22 while the other end of the reflective member 56 can rest on top of the vortex generator 136. The space presented under the reflective member 56 allows air flow 134 to be directed under the reflective member 56 so that this air flow 134 can in turn push the reflective member 56 up and down, and possibly side to side. The reflective member 56 can be pivoted about its attachment point to the upper surface 22. The shape of the vortex generator 136 may be such that the air flow 134 created is turbulent.

The vortex generators 136 may be located on the same side of the reflective member 56 for all of the reflective members 56 on the first arm 16. Alternatively, the vortex generators 136 can be on opposite sides on some of the reflective members 56 so that if the wind is blowing in an opposite direction, at least some of the reflective members 56 will have air flow 134 under them to induce their movement when wet. As shown in FIG. 8, the positioning of the vortex generators 136 on different ones of the reflective members 56 are varied so that some reflective members 56 may always be moving regardless of the direction of the wind. However, all of the vortex generators 136 can be arranged in any number of manners in other embodiments.

Figure 10:
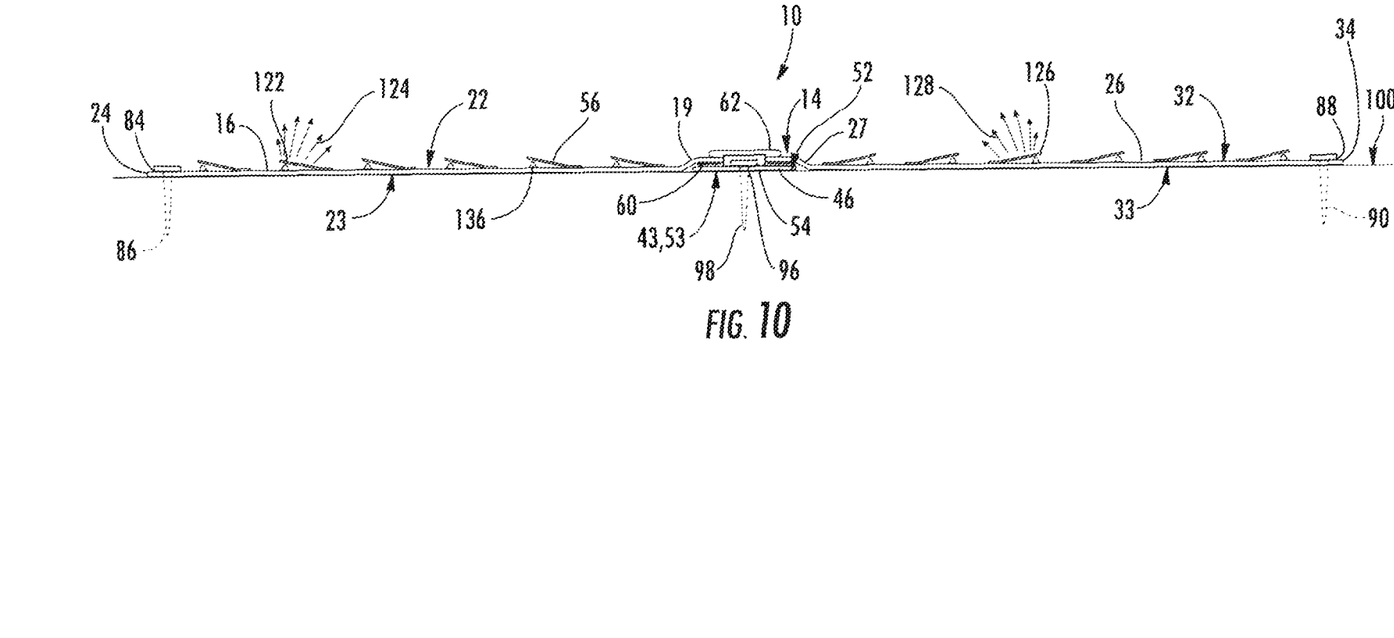
FIG. 10 is a side elevation view of a rescue location signal in accordance with another exemplary embodiment.

Another exemplary embodiment of the rescue locator signal 10 is shown in FIG. 10 in which the first tie down 86 and the second tie down 90 are stakes without string or rope that are directly placed through the first grommet 84 and the second grommet 88. The reflective members 56 are attached on only one end and are identically arranged on each arm 16 and 26. They may be present on arms 36 and 46 as well. The reflective members 56 are made of reflective material and are attached so as to move when the wind is blowing from different directions. The vortex generators 136 allow wind to move under the reflective members 56 when wet. In this regard, if the vortex generators 136 were not present, the reflective members 56 may stick onto the upper surfaces of the arms 16 and 26 when there is rain thereon through surface tension forces. However, it is to be understood that the vortex generators 136 are not present in other exemplary embodiments.

One of the reflective members 56 is marked as reflective member 122 and is shown as projecting reflected light 124. A different reflective member 126 that is on arm 26 is oriented into a different position in which it partially faces forward and to the left in FIG. 10. Reflective member 126 emits reflective light 128. Reflected light 124 and 128 are in different directions so that the chances of being spotted by a search party are increased. The reflected light 124 and 128 may not be parallel to one another and may in fact cross one another in certain embodiments. The ends of the reflective members 56 that are attached to the arms 16 and 26 (in addition to arms 36 and 46) may be the ends that are farthest from the central member 12 in the various longitudinal directions.

The various reflective members 56 can move in different angles when the rescue locator signal 10 is subjected to a slight breeze thus allowing reflected light to be transmitted at numerous angles and different directions.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. A rescue locator signal, comprising:
a central member;
a first arm extending from the central member in a first direction;
a second arm extending from the central member in a second direction that is completely opposite to the first direction;
a third arm extending from the central member in a third direction;
a fourth arm extending from the central member in a fourth direction that is completely opposite to the third direction;
a plurality of reflective film members located on an upper surface of the first arm, an upper surface of the second arm, an upper surface of the third arm, and an upper surface of the fourth arm;
a plurality of vortex generators that are attached to and extend from the upper surfaces of the first arm, the second arm, the third arm, and the fourth arm, wherein the plurality of reflective film members are pivotally attached to the upper surface of the arm onto which they are located, wherein the plurality of reflective members engage the plurality of vortex generators such that a portion of the reflective film members are spaced from the upper surfaces to which they are directly and pivotally attached to allow air to flow between a non-attached portion of the reflective film members and the upper surfaces to which they are pivotally attached thereby allowing the air flow to displace the non-attached portion of the reflective film members from an upper arm surface and the vortex generators, thereby increasing movement and visibility of the reflective film relative to the upper arm surface.

2. The rescue locator signal as set forth in claim 1, wherein the first arm, the second arm, the third arm, the fourth arm, and the reflective members are flexible such that they are capable of being folded and rolled and placed into a storage tube for storage and transport purposes.

3. The rescue locator signal as set forth in claim 2, wherein the first arm, the second arm, the third arm, and the fourth arm are made of flexible polyvinyl chloride, and wherein the reflective members are made of a reflective film.

4. The rescue locator signal as set forth in claim 1, wherein the central member, the first arm, and the second arm are a first single integral piece, and wherein the third arm and the fourth arm are a second single integral piece, wherein the first single integral piece is releasably attachable to the second single integral piece.

5. The rescue locator signal as set forth in claim 1, further comprising:
a message pouch located on an upper surface of the central member; and
a waterproof form located in the message pouch.

6. The rescue locator signal as set forth in claim 5, wherein the form has a front surface with indicia that prompts a user to enter names, ages, medical conditions, food supply, and family contact information for individuals in need of rescue, and wherein the form has a back surface with a grid map having the rescue locator signal noted thereon that prompts a user to enter the location of the individuals in need of rescue relative to a location of the rescue locator signal.

7. The rescue locator signal as set forth in claim 1, wherein the upper surface of the first arm, the upper surface of the second arm, the upper surface of the third arm, and the upper surface of the fourth arm are bright orange in color, wherein lower surfaces of the first arm, the second arm, the third arm, and the fourth arm engage ground, and further comprising:
a first grommet carried by the first arm;
a first tie down disposed through the first grommet, wherein the first tie down has a first stake disposed into the ground for use in attaching the first arm to the ground;
a second grommet carried by the second arm;
a second tie down disposed through the second grommet, wherein the second tie down has a second stake disposed into the ground for use in attaching the second arm to the ground;
a third grommet carried by the third arm;
a third tie down disposed through the third grommet, wherein the third tie down has a third stake disposed into the ground for use in attaching the third arm to the ground;
a fourth grommet carried by the fourth arm; and
a fourth tie down disposed through the fourth grommet, wherein the fourth tie down has a fourth stake disposed into the ground for use in attaching the fourth arm to the ground.

8. The rescue locator signal as set forth in claim 1, wherein the upper surface of the first arm is rectangular in shape, and wherein the reflective film members on the upper surface of the first arm are arranged so that consecutive ones of the reflective film members are spaced from one another in a longitudinal direction of the first arm and such that the reflective film members are positioned over substantially an entire longitudinal length of the first arm;
wherein the upper surface of the second arm is rectangular in shape, and wherein the reflective members on the upper surface of the second arm are arranged so that consecutive ones of the reflective film members are spaced from one another in a longitudinal direction of the second arm and such that the reflective film members are positioned over substantially an entire longitudinal length of the second arm;
wherein the upper surface of the third arm is rectangular in shape, and wherein the reflective film members on the upper surface of the third arm are arranged so that consecutive ones of the reflective film members are spaced from one another in a longitudinal direction of the third arm and such that the reflective film members are positioned over substantially an entire longitudinal length of the third arm;
wherein the upper surface of the fourth arm is rectangular in shape, and wherein the reflective film members on the upper surface of the fourth arm are arranged so that consecutive ones of the reflective film members are spaced from one another in a longitudinal direction of the fourth arm and such that the reflective film members are positioned over substantially an entire longitudinal length of the fourth arm.

9. A rescue locator signal, comprising:
a central member, wherein the central member has an upper surface that is rectangular;
a form located at the central member, wherein the form provides information regarding a name of a person in need of rescue, and a location of the person in need of rescue relative to the location of the rescue locator signal;

a first arm extending from the central member, wherein the first arm has an upper surface that is rectangular in shape;

a second arm extending from the central member, wherein the second arm has an upper surface that is rectangular in shape, wherein the first arm and the second arm are oriented at an angle of 180° to one another;

a third arm extending from the central member, wherein the third arm has an upper surface that is rectangular in shape, wherein the first arm and the third arm are oriented at an angle of 90° to one another, and wherein the second arm and the third arm are oriented at an angle of 90° to one another;

a fourth arm extending from the central member, wherein the fourth arm has an upper surface that is rectangular in shape, wherein the first arm and the fourth arm are oriented at an angle of 90° to one another, wherein the second arm and the fourth arm are oriented at an angle of 90° to one another, and wherein the third arm and the fourth arm are oriented at an angle of 180° to one another;

a plurality of reflective film members located on the upper surfaces of the first arm, second arm, third arm, and fourth arm such that at least one reflective film member is located on the upper surface of the first arm, at least one reflective film member is located on the upper surface of the second arm, at least one reflective film member is located on the upper surface of the third arm, and at least one reflective film member is located on the upper surface of the fourth arm;

a plurality of vortex generators that are attached to and extend from the upper surfaces of the first arm, the second arm, the third arm, and the fourth arm, wherein the plurality of reflective film members are pivotally attached to the upper surface of the arm onto which they are located, wherein the plurality of reflective members engage the plurality of vortex generators such that a portion of the reflective film members are spaced from the upper surfaces to which they are directly and pivotally attached to allow air to flow between a non-attached portion of the reflective film members and the upper surfaces to which they are pivotally attached thereby allowing the air flow to displace the non-attached portion of the reflective film members from the vortex generators, thereby increasing movement and visibility of the reflective film relative to the upper arm surface.

10. The rescue locator signal as set forth in claim 9, wherein the upper surface of the central member has a shape that is square, wherein a longitudinal length of the first arm is equal to a longitudinal length of the second arm, wherein the longitudinal length of the first arm is equal to a longitudinal length of the third arm, and wherein the longitudinal length of the first arm is equal to a longitudinal length of the fourth arm.

11. The rescue locator signal as set forth in claim 9, wherein the central member, the first arm, the second arm, the third arm, the fourth arm, and the reflective film members are flexible such that they are capable of being folded and rolled and placed into a storage tube for storage and transport purposes.

12. The rescue locator signal as set forth in claim 10, wherein the central member, the first arm, the second arm, the third arm, and the fourth arm are made of flexible polyvinyl chloride.

13. The rescue locator signal as set forth in claim 11, wherein 24 of the reflective film members are present, wherein 6 of the 24 reflective film members are located on the upper surface of the first arm and are spaced from one another such that none of the 6 reflective film members engage one another and are arranged linearly along a longitudinal direction of the first arm, wherein 6 of the 24 reflective film members are located on the upper surface of the second arm and are spaced from one another such that none of the 6 reflective film members engage one another and are arranged linearly along a longitudinal direction of the second arm, wherein 6 of the 24 reflective film members are located on the upper surface of the third arm and are spaced from one another such that none of the 6 reflective film members engage one another and are arranged linearly along a longitudinal direction of the third arm, wherein 6 of the 24 reflective film members are located on the upper surface of the fourth arm and are spaced from one another such that none of the 6 film reflective members engage one another and are arranged linearly along a longitudinal direction of the fourth arm.

14. The rescue locator signal as set forth in claim 9, wherein the central member, the first arm, and the second arm are a first single integral piece, and wherein the third arm and the fourth arm are a second single integral piece, wherein the first single integral piece is releasably attachable to the second single integral piece.

15. The rescue locator signal as set forth in claim 9, further comprising a message pouch located on the upper surface of the central member, wherein the form is waterproof and provides information regarding an age of the person in need of rescue, a medical condition of the person in need of rescue, a food supply of the person in need of rescue, and family contact information for the person in need of rescue.

16. The rescue locator signal as set forth in claim 9, wherein the upper surface of the first arm, the upper surface of the second arm, the upper surface of the third arm, and the upper surface of the fourth arm are bright orange in color, wherein lower surfaces of the first arm, the second arm, the third arm, and the fourth arm engage ground, and further comprising:

a first grommet carried by the first arm;
a first tie down disposed through the first grommet, wherein the first tie down has a first stake disposed into the ground for use in attaching the first arm to the ground;
a second grommet carried by the second arm;
a second tie down disposed through the second grommet, wherein the second tie down has a second stake disposed into the ground for use in attaching the second arm to the ground;
a third grommet carried by the third arm;
a third tie down disposed through the third grommet, wherein the third tie down has a third stake disposed into the ground for use in attaching the third arm to the ground;
a fourth grommet carried by the fourth arm; and
a fourth tie down disposed through the fourth grommet, wherein the fourth tie down has a fourth stake disposed into the ground for use in attaching the fourth arm to the ground.

17. A rescue locator signal, comprising:

a central member, wherein the central member has an upper surface;

a form located on the upper surface of the central member, wherein the form provides information regarding a name of a person in need of rescue, and a location of the person in need of rescue relative to the location of the rescue locator signal;

a first arm extending from the central member, wherein the first arm has an upper surface that is rectangular in shape and is orange and is made of flexible polyvinyl chloride;

a first grommet located proximate to a terminal end of the first arm;
a first tie down disposed through the first grommet, wherein the first tie down has a first stake disposed into ground for use in attaching the first arm to the ground;
a second arm extending from the central member, wherein the second arm has an upper surface that is rectangular in shape and is orange and is made of flexible polyvinyl chloride, wherein a longitudinal direction of the first arm is oriented at an angle of 180° to a longitudinal direction of the second arm;
a second grommet located proximate to a terminal end of the second arm;
a second tie down disposed through the second grommet, wherein the second tie down has a second stake disposed into the ground for use in attaching the second arm to the ground;
a third arm extending from the central member, wherein the third arm has an upper surface that is rectangular in shape and is orange and is made of flexible polyvinyl chloride, wherein the longitudinal direction of the first arm is oriented at an angle of 90° to a longitudinal direction of the third arm;
a third grommet located proximate to a terminal end of the third arm;
a third tie down disposed through the third grommet, wherein the third tie down has a third stake disposed into the ground for use in attaching the third arm to the ground;
a fourth arm extending from the central member, wherein the fourth arm has an upper surface that is rectangular in shape and is orange and is made of flexible polyvinyl chloride, wherein the longitudinal direction of the first arm is oriented at an angle of 90° to a longitudinal direction of the fourth arm, and wherein the longitudinal direction of the third arm is oriented at an angle of 180° to the longitudinal direction of the fourth arm;
a fourth grommet located proximate to a terminal end of the fourth arm;
a fourth tie down disposed through the fourth grommet, wherein the fourth tie down has a fourth stake disposed into the ground for use in attaching the fourth arm to the ground;
a plurality of reflective members made of film, wherein some of the plurality of reflective members are located on and directly and pivotally attached to the upper surface of the first arm between the first grommet and an end of the first arm that engages the central member, wherein some of the plurality of reflective film members are located on and directly and pivotally attached to the upper surface of the second arm between the second grommet and an end of the second arm that engages the central member, wherein some of the plurality of reflective film members are located on and directly and pivotally attached to the upper surface of the third arm between the third grommet and an end of the third arm that engages the central member, wherein some of the plurality of reflective members are located on and directly and pivotally attached to the upper surface of the fourth arm between the fourth grommet and an end of the fourth arm that engages the central member;
a vortex generator located on the upper surface of the first arm and below a portion of one of the reflective film members of the first arm to allow air flow between a non-attached portion of the reflective film members and the upper surface of the first arm, thereby allowing the air flow to displace a portion of the reflective film members from the upper arm surface, thereby increasing movement and visibility of the reflective film relative to the upper arm surface;
wherein the central member, the form, the first arm, the second arm, the third arm, the fourth arm, the first grommet, the second grommet, the third grommet, the fourth grommet, and the reflecting members are capable of being folded up and rolled and stored in a storage tube.

18. The rescue locator signal as set forth in claim 17, wherein the reflective film member engages the vortex generator such that the portion of the reflective member is spaced from the upper surface of the first arm, wherein the reflective film member is pivotally attached to the upper surface of the first arm, wherein the spacing allows air to flow between the reflective member and the upper surface of the first arm.

* * * * *